United States Patent [19]

Bass et al.

[11] Patent Number: 5,355,350
[45] Date of Patent: Oct. 11, 1994

[54] PASSIVE ACOUSTIC TORNADO DETECTOR AND DETECTION METHOD

[76] Inventors: Henry E. Bass, 2906 Old Taylor Rd., Oxford, Miss. 38655; Haiping Yan, 67-102 Burns St., Forest Hill, N.Y. 11375

[21] Appl. No.: 64,919

[22] Filed: May 24, 1993

[51] Int. Cl.5 .................. H04B 17/00; G08B 21/00
[52] U.S. Cl. .................. 367/13; 340/601; 73/170.16; 367/135
[58] Field of Search .......... 340/601; 367/13, 191, 367/135, 136, 178; 73/170.16, 384

[56] References Cited

U.S. PATENT DOCUMENTS

| | | | |
|---|---|---|---|
| 2,898,461 | 8/1959 | Kernan | 250/27 |
| 2,928,277 | 3/1960 | Cavanagh et al. | 73/170 |
| 3,245,078 | 4/1966 | Kohl | 343/112 |
| 3,646,540 | 2/1972 | Cooper | 340/241 |
| 3,753,117 | 8/1973 | Downing et al. | 325/364 |
| 3,810,137 | 5/1974 | Bacon, Jr. et al. | 340/224 |
| 4,602,248 | 7/1986 | Foster et al. | 340/601 |
| 4,632,052 | 12/1986 | Green | 116/70 |
| 4,825,165 | 4/1989 | Helms et al. | 340/601 |
| 5,038,328 | 8/1991 | Brunius | 367/135 |

*Primary Examiner*—Ian J. Lobo
*Attorney, Agent, or Firm*—Bacon & Thomas

[57] ABSTRACT

A tornado detector includes a microphone which monitors outdoor noise for increasing amplitude within a frequency range characteristic of a tornado. When the sound pressure level within the passband of the detector exceeds established thresholds, logic is applied to determine whether the level is increasing at a rate indicative of an approaching tornado and therefore whether an alarm is to be sounded.

15 Claims, 13 Drawing Sheets

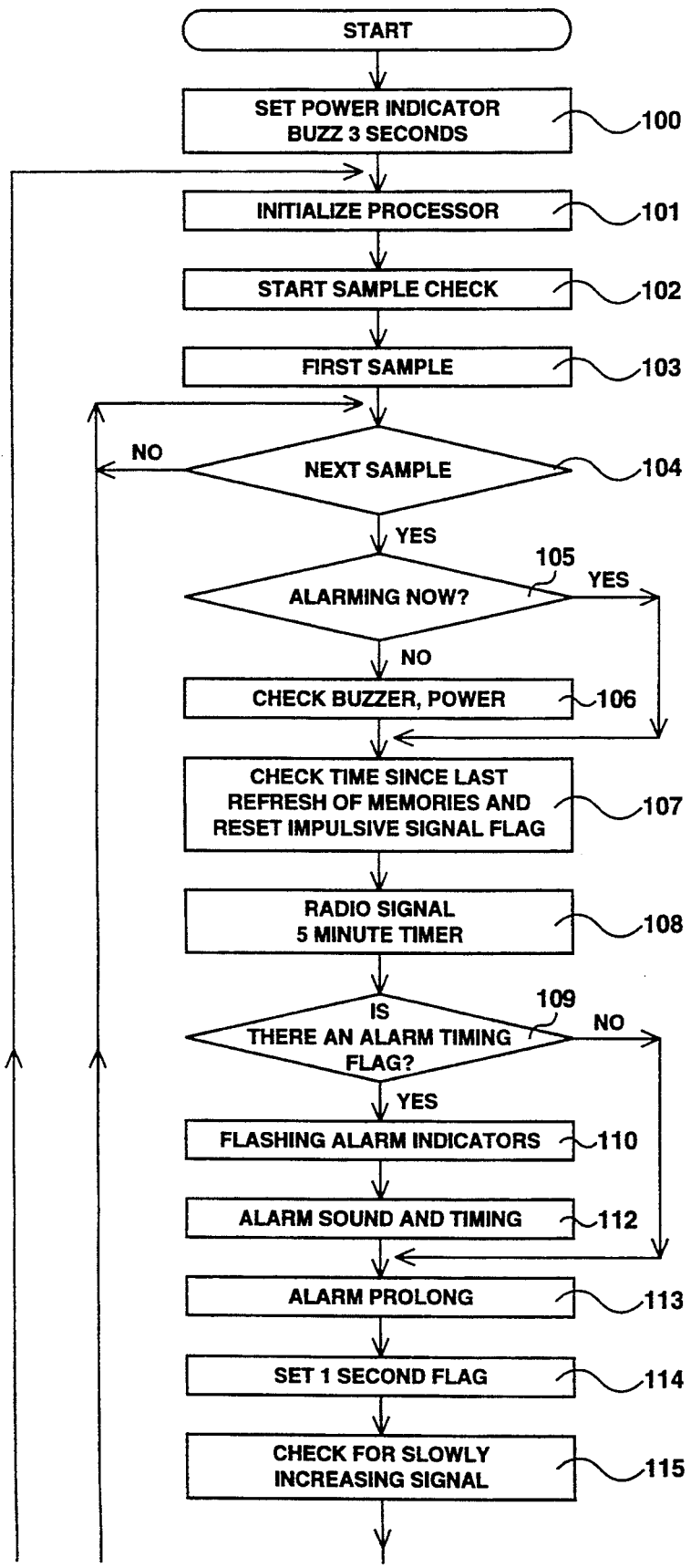

PASSIVE ACOUSTIC TORNADO DETECTOR AND DETECTION METHOD

BACKGROUND OF THE INVENTION

1. Field of the Invention

The present invention generally relates to remote sensing of a tornado and, more specifically, to a system designed to receive acoustic emissions associated with a tornado, identify the emissions, and sound an alarm.

2. Description of Related Art

Tornados represent a significant hazard to persons living in many regions of the world. Advanced warning of an approaching tornado allows people to take shelter, thereby reducing the probability of injury or death.

The National Weather Service uses various radars in the U.S. to identify when conditions are conducive for the formation of a tornado and, based on identification of those conditions, issues tornado watches and warnings over the broadcast media. However, the time required to issue warnings and the resolution of the radar currently used by the National Weather Service limits the specificity of the warnings. For example, the alerted area often covers several hundred square miles, and the probability of a tornado affecting any particular location within a warned area is thus vanishingly small. As a result, tornado warnings and watches issued by the National Weather Service can at best serve to heighten the sensitivity of persons in the affected area to the signs, visual and aural, of an approaching tornado. For many individuals, despite the warnings and watches, the chance of reaching a shelter may already have passed by the time the tornado is actually observed.

The sounds of tornados have previously been described in literature and reported by the broadcast media in anecdotal form. While interviews with survivors of tornados suggests that the sound level generated by the tornados is very high and that the sound is distinctive, actual sound recordings of the tornados are often contaminated by voices and other background noise. Nevertheless, the anecdotes have been borne out by the inventors' analysis of the best recordings, which shows that tornados do in fact have similar acoustic spectra, even though the actual mechanism for sound production has not been specifically identified.

There are a number of devices available in the marketplace which warn of an approaching tornado, but none makes use of the tornado's acoustic emissions. The most widely used is a radio receiver tuned to the National Weather Service which sounds an alarm when the National Weather Service issues a severe weather warning although, as noted above, these warnings are general in nature and cover a large area.

Most other conventional tornado warning devices are based on the emission of electromagnetic radiation which is often associated with a severe storm. The electromagnetic radiation is received by some type of radio frequency receiver, and an alarm is sounded when the electromagnetic signal meets specified criteria. For example, U.S. Pat. No. 3,245,078 (Kohl) discloses a system for tracking the electromagnetic emissions of multiple weather patterns. This pattern includes a pulse counter for counting the number of times the electromagnetic signal received exceeds a proportion of its average peak value per unit time. U.S. Pat. No. 3,810,127 (Bacon) and U.S. Pat. No. 3,646,540 (Cooper) also disclose devices which detect the radio frequency emissions of an approaching tornado, while U.S. Pat. No. 2,928,277 (Cavanaugh) discloses a device which employs an active radar or sonar measurement. On the other hand, a completely different approach is disclosed by U.S. Pat. No. 4,632,052 (Green), which discloses a simple mechanical device to warn of sudden drops of barometric pressure that may indicate the approach of a tornado.

While many of the prior devices have the potential to save lives by warning of an approaching tornado, each has disadvantages which have prevented their widespread utilization in affected areas. Active radar or sonar systems are generally too complex and expensive for individual use, while the remaining systems suffer from a variety of problems, including the problem of false alarms.

The present invention, in contrast, for the first time effectively uses the fact that tornados emit sounds which are sufficiently unique to identify and use as a basis for sounding an alarm, and therefore may be detected by a relatively simple and inexpensive passive acoustic receiver. While passive acoustic devices have been previously used for detection purposes in a variety of unrelated contexts, such as for monitoring highway noise, detecting intruders, and the like, they have not been used for detecting tornadoes.

SUMMARY OF THE INVENTION

It is accordingly an objective of the invention to provide a tornado detector which is sufficiently affordable for widespread use by individual households or small groups of households in affected areas, in order to provide an area-specific warning of an approaching tornado which provides sufficient time for individuals in the area to reach shelter, with a minimum of false alarms.

This objective is achieved, in accordance with a preferred embodiment of the invention, by providing an acoustic tornado detector and a tornado identification method which identifies the acoustic emissions of a tornado, and sounds an alarm based thereon. The tornado is also detected based on the rate of increase of the sound level which indicates the tornado's approach.

The device of the preferred embodiment is capable of identifying a tornado at a range of about ½ mile and, depending upon the speed of the tornado, provides 30 seconds to one minute warning time. A longer warning time can be provided for, but the lower sound threshold for detection would increase the number of false alarms.

BRIEF DESCRIPTION OF THE DRAWINGS

FIGS. 4a–4c form a flowchart illustrating an exemplary tornado detection algorithm for the processor of FIG. 2.

DETAILED DESCRIPTION OF THE PREFERRED EMBODIMENTS

Figure 1:
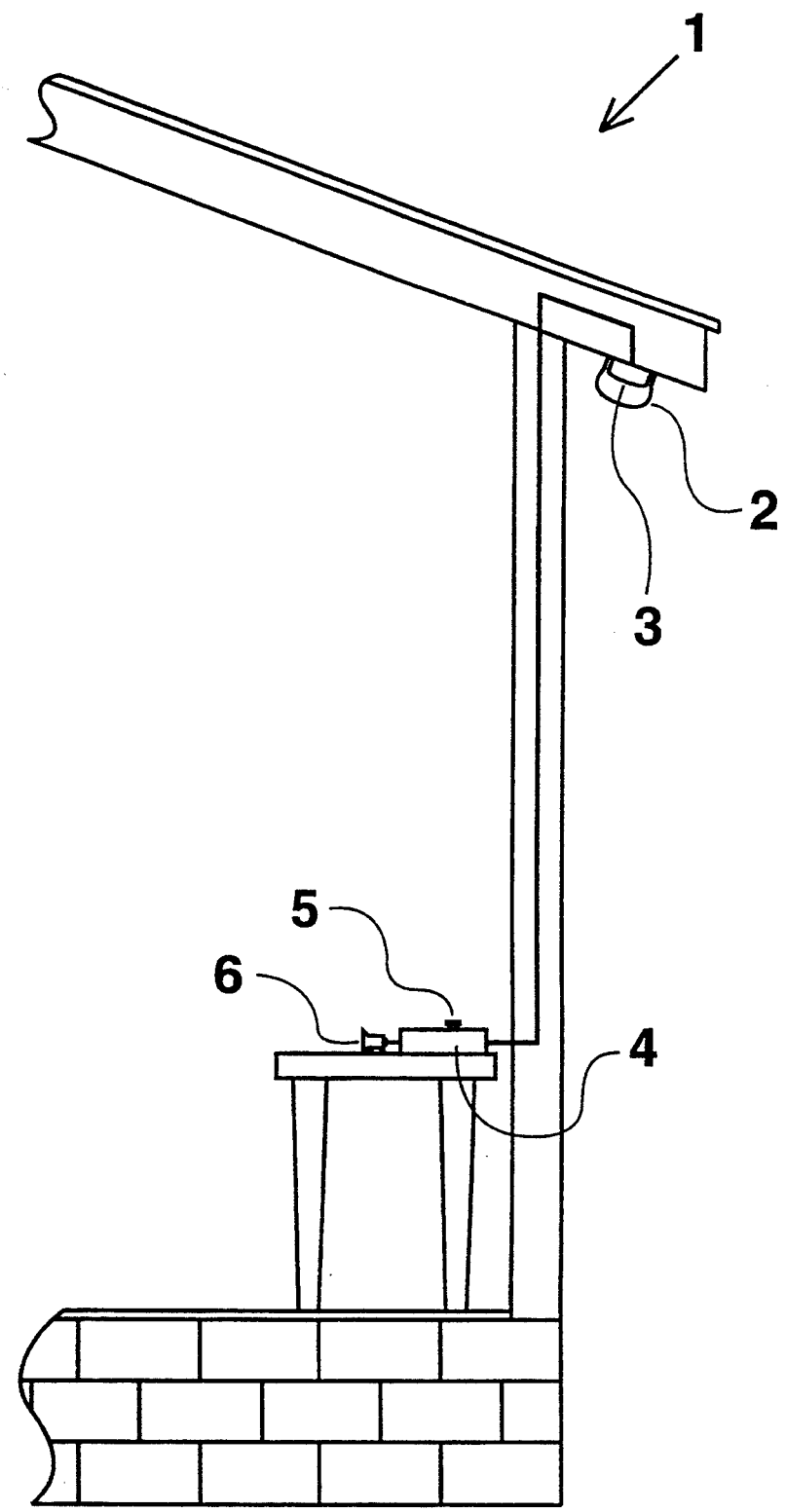
FIG. 1 is a schematic view illustrating an example of how to implement a passive acoustic tornado detector arranged according to a preferred embodiment of the invention.

FIG. 1 shows an arrangement of components for providing tornado detection in an individual residence or other building 1 in accordance with a preferred embodiment of the invention. The components include a sound sensor package 2 including a microphone 3 connected to a central control unit 4. The central control unit 4 may desirably be provided with an ON/OFF switch 5 (17 in FIG. 3) since the system will generally only be operated when the National Weather Service provides a tornado watch or warning over the broadcast media. It will be appreciated, however, that the system may be operated continually independent of the National Weather Service. The central control unit 4 is also connected to an alarm 6 located in an appropriate place inside or outside the residence sufficient to warn all inhabitants of the approach of a tornado.

Figure 2:
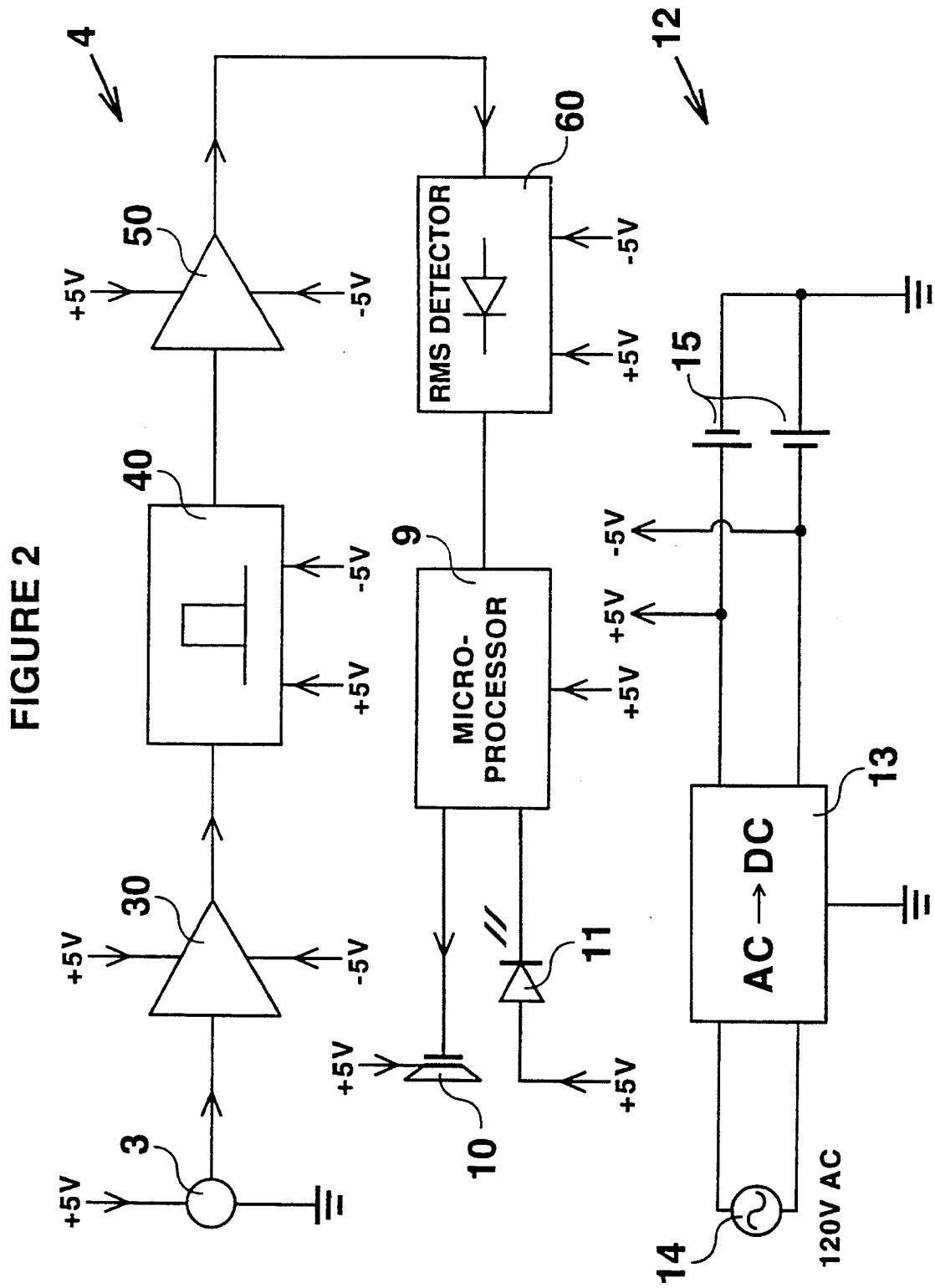
FIG. 2 is a block diagram of a tornado identification circuit for the preferred passive acoustic tornado detector.
Figure 3:
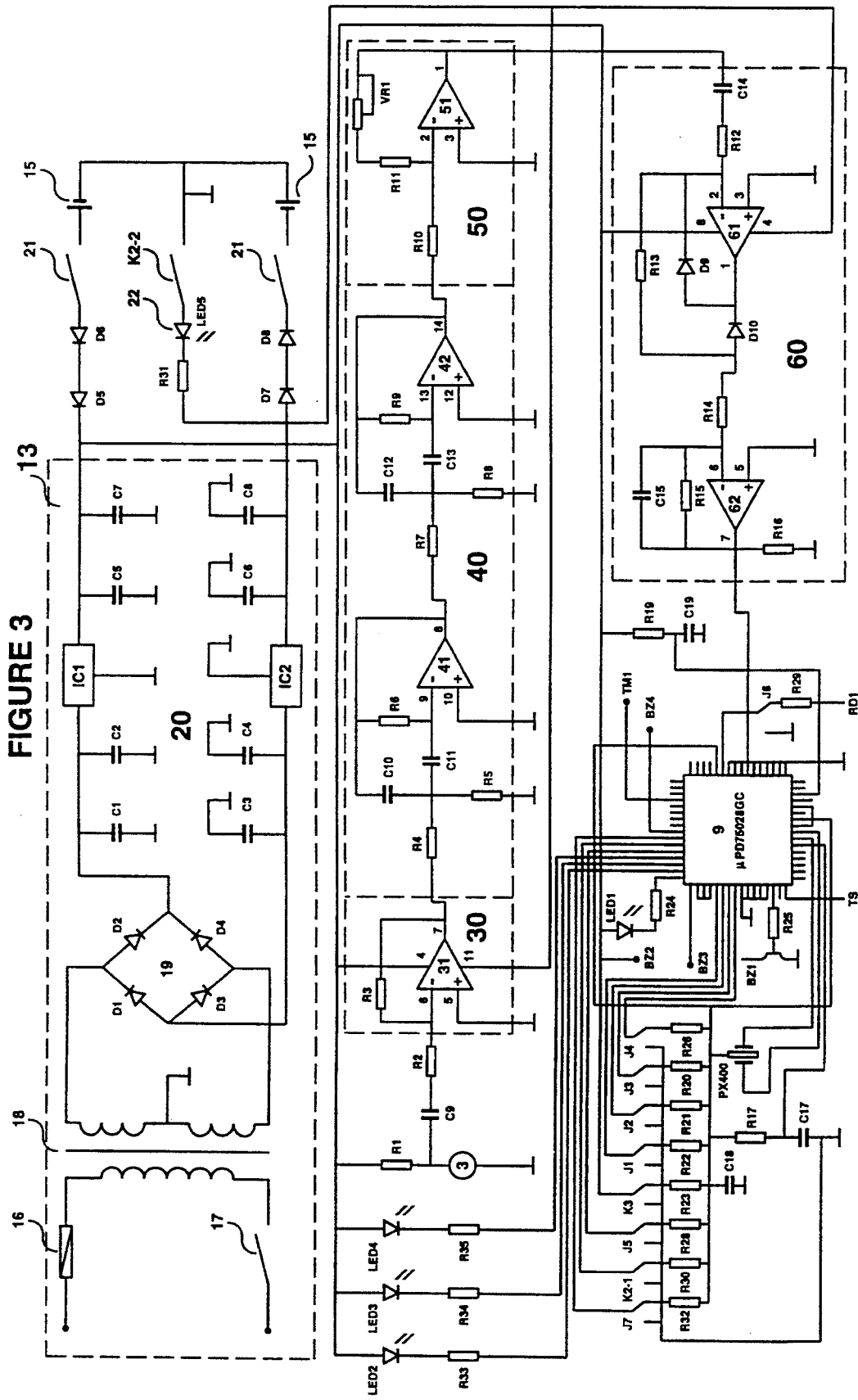
FIG. 3 is a detailed diagram of the tornado identification circuit of FIG. 2.

FIG. 2 is a schematic block diagram of the central control unit 4. Details of the components shown in FIG. 2 are illustrated in FIG. 3. The central control unit 4 processes the electrical signals received from the microphone by, preferably, amplifying and filtering the signals to minimize both the background wind noise associated with the wind/microphone interaction and also manmade noise, which is typically at frequencies higher than that emitted by a tornado, converts the filtered signal to a slowly varying electrical level, and presents the converted signal to the analog to digital converter on the microprocessor chip which digitizes the signal. The microprocessor makes decisions based on the flowcharts shown in FIGS. 4–10. When a tornado is identified, the microprocessor 9 sends a signal to alarm 6, which may include a warning buzzer 10, light emitting diodes 11 (LED2, LED3, and LED4 in FIG. 3), and/or other audible or visual alarms.

Microprocessor 9 makes all decisions about when the alarm should sound and is therefore a key element in the system. Two features of the received acoustic signals determine whether or not an alarm is sounded. The first is the overall sound level of the received acoustic signals, and the second is the rate of change of that level.

The control unit 4 includes a power supply 12 for supplying the control unit with a DC voltage of, in the illustrated embodiment, 5 volts. Power supply 12 includes an AC-DC converter 13 for enabling the control unit to be connected to an AC power supply 14, either by being connected to the power transmission grid or to a generator. However, to provide continuous operation even if AC power is interrupted, ordinary batteries 15 are also included to provide the required voltage, preferably for a period of at least six hours.

As shown in more detail in FIG. 3, the AC-DC converter includes an ON-OFF switch 17, a fuse 16, a transformer 18, a rectifier circuit 19 formed by four diodes D1 to D4 and a voltage regulation circuit 20 including smoothing capacitors C1–C8, LM78MO5 circuit IC1 and LM79MO5 circuit IC2, each of the components of the AC-DC converter being well-known in the art. The illustrated battery back-up, connected via switches 21 as shown in FIG. 3, may use, for example, eight 1.5 volt household-type AA batteries 15, with diodes D5–D8 provided to isolate the output of the AC-DC converter 13 from the batteries and reduce the total voltage output of the batteries from 6 volts to 5 volts. If 1.25 rather than 1.5 volt batteries are used, diodes D5–D8 are not required.

Those skilled in the art will appreciate that the respective capacity and resistance values and part identifiers for the components of both the AC/DC converter and battery back-up portions of power supply 12 are optional and form no part of the invention. However, by way of example, the diodes D1–D8 may be IN4001 diodes, and capacitors C1–C8 may have values of, respectively, 100, 0.1, 100, 0.1, 22, 22, 0.1 and 0.1 microfarads. Also, a light-emitting diode 22 may optionally be connected to the battery circuit via resistor R31 and to a double pole double throw push button switch K2 (K2-1 and K2-2 in FIG. 3) in order to provide an indication that negative battery power is available and that the microprocessor is working. The buzzer will sound for three seconds when K2 is pushed. LED 1 is connected to the microprocessor via resistor R24. When +5V from the AC-DC converter or from the batteries is on, LED1 will be on to indicate +5V power is available.

Microphone 3 is connected to the positive voltage output by circuit 13 or batteries 15 through a resistor R1 having a value of, for example, 2.2K. The microphone 3 is also connected to a pre-amplifier circuit 30 via capacitor C9 (e.g., 10 $\mu$F) and resistor R2 (e.g., 1K). Preamplifier circuit 30 includes an op-amp 31 (e.g., pin numbers 5, 6 and 7 on chip LM324CN, also shared by the filters and amplifier discussed below), including a feedback resistor R3 having a value of, in this example, 100K. After preamplification, the signal is filtered by filter 40, through pins 8, 9, 10 and 12–14 on chip LM324CN. Op amps 41 and 42, together with resistors R4 and R7 (6.49K), R6 and R9 (13.3K), R5 (4.02K), and R8 (4.02K) and capacitors C10–C13 (0.1$\mu$F) form a pair of band pass filters, with the decibel point at 180 Hz, and at 420 Hz. The values of the filters have been chosen to select that part of the acoustic spectrum where research has shown that there is maximum acoustic amplitude. It is assumed that these values apply to tornados in all areas but, if not, the frequencies of the band pass filter can easily be varied by those skilled in the art as required.

After amplification by an amplifier 50 which includes LM324CN op amp 51 (pins 1–3) and resistors R10 (10K), R11 (24K) and VR1 (51K), the amplified signal is passed through a root-mean-square detector 60 including IC LF412N op amps 61 (pins 1–3) and 62 (pins 5–7), with input capacitor C14 (10 $\mu$F), resistor R12 (10K) and resistors R13–R16 (10K, 4.99K, 61.9K, and 510K, respectively), capacitors C15 (22$\mu$F), and diodes D9 and D10 (IN014) which converts the 150 Hz to 480 Hz signal to a slowly varying DC signal. The time constant of the RMS detector is 1.3 seconds. The filtered and amplified signal is then input to the analog to digital converter on the microprocessor chip 9, which in the illustrated example is a $\mu$PD75028GC processor connected to the power supply both directly and via resistor R19 (0.150K) and capacitor C19 (1.047$\mu$F), although those skilled in the art will appreciate that a variety of microprocessors are available which are capable of performing the functions shown in FIGS. 4–9.

Connected to processor 9 are a variety of jumpers J 1–J7 and other switches for optionally setting the processor. Except for jumper J2, the jumper connections include resistors R20, R21-R23, R26, R28, R30, and R32 (5.1K each). Resistor R17 (5.1k) and capacitor C17 (10 µF) filter the positive 5 volts power and supply power to the analog to digital converter on the microprocessor. PX400 is a 4 MHz oscillator. An indicator (LED1) is connected to the processor 9 via a 1K resistor R24.

J2 is connected for selection of ±5 volt or ±9 volt power sources. Terminal TS provides a 16 Hertz square wave for circuit testing purposes, and jumpers J1, J4 and J7 may also be used to test the circuit and microprocessor program. Jumper J5 is included for future use with remote activation. J6 is included for use with weather radio alerts normally connected to ground. K3 is a manual switch for selecting sensitivity (e.g., between 73 and 79 dB) and is normally not used. Terminal TM allows the option of using the detector as a transmitter to send a warning signal to other detectors through terminal TM 1. J3 is a jumper which can prolong the time the alarm stays on, once activated to 32S. J6 is a jumper which can change the sensitivity of the detector by switching between resistor R29 (1K) and direct connection to ground, and may be used in conjunction with a radio frequency receiver, connected to terminal RD1, which receives a signal from the National Weather Service or another tornado detector for indicating a high probability that a tornado will occur, in order to automatically switch the detector to a higher sensitivity mode whenever appropriate.

Pole 1 (K2-1) via resistor R30 triggers the processor and activates the buzzer for three seconds as a test. Pole 2 (K2-2) causes LED5 to light via R31 (1K). K2 is a double pole, double throw (DPDT) pushbutton switch. LED2, LED 3 and LED 4 are warning lights, connected to processor 9 via resistors R33 (1K), R34 (1K) and R35 (1K). The various buzzer output options are BZ1-BZ3. Buzzer outputs BZ2 and BZ3 provide a DC voltage in case the buzzers have internal oscillators. Buzzer output BZ2 and BZ1, the latter connected to processor 9 via transistor TR1 and resistor R25(10k), control a buzzer with an external oscillator circuit. Buzzer output BZ4 goes high when warning is required and may be used to control an auxiliary buzzer or siren.

The operation of the microprocessor 9 is depicted by the flowcharts of FIGS. 4a–4c, 5, 6, 7, 8, 9 and 10a–10b. As noted above, those skilled in the art will appreciate that a variety of microprocessors are available which are capable of performing the functions shown in FIGS. 4-10, and that the specific circuitry described above and the following programs may be varied accordingly. Thus, both the circuit diagrams of FIGS. 2 and 3 and the flowcharts of FIGS. 4-10 should be viewed as exemplary in nature and not limiting.

Step 100 is a test operation in which the buzzer is set to sound for a period of time, such as three seconds in order to test the microprocessor and buzzer operation. The processor is initialized in step 101 and the sampling rate clock is set at, for example, 1/16 second (using a 4.19 MHz crystal; 5% shorter for PX400). The microprocessor then enters a data sampling loop (steps 104–143). In order to minimize the effect of noise, the program takes four samples and sums. If the system has already been through the loop and is sounding an alarm, as determined in step 105, the requirements for power and microprocessor checks are skipped, but otherwise the microprocessor is again checked (step 106), for example by sounding the buzzer for one second and inhibiting it for four seconds.

In step 107, the flag indicating memory refresh and the flag for resetting an impulsive signal are checked. The period between memory refresh is 24 seconds. When the refresh memories flag is set, the counter is increased by 1 for every sample (1/16 second). When the counter equals 24 seconds, the flag is reset and the counter is reset. The period for resetting the impulsive signal flag is 5 seconds.

Step 108 is the timing for a radio signal trigger. When a signal is received, the radio signal flag sets. The processor will then lower the threshold for detection to 73 dB for a period of five minutes. After five minutes, the processor reverts back to the standard detection threshold. Note that the circuit includes a manual switch (K3) to increase sensitivity to 73 dB.

Steps 110–113 are carried out if there is an alarm signal, in the form of an alarm timing flag as determined by step 109. This routine causes the processor to flash the alarm indicators (step 110), switch to 73 dB (sensitive) detection if a radio signal from a nearby tornado detector exits, i.e., if terminal RD1 is connected as explained above, control the buzzer sound for an alarm in step 112, and prolong the alarm by, for example, a 32 second count if necessary in step 113. In step 114, after sixteen samples (one second) a timing flag is set on the 16th pass. The sum of the 16 samples forms a one second signal value.

Figure 5:
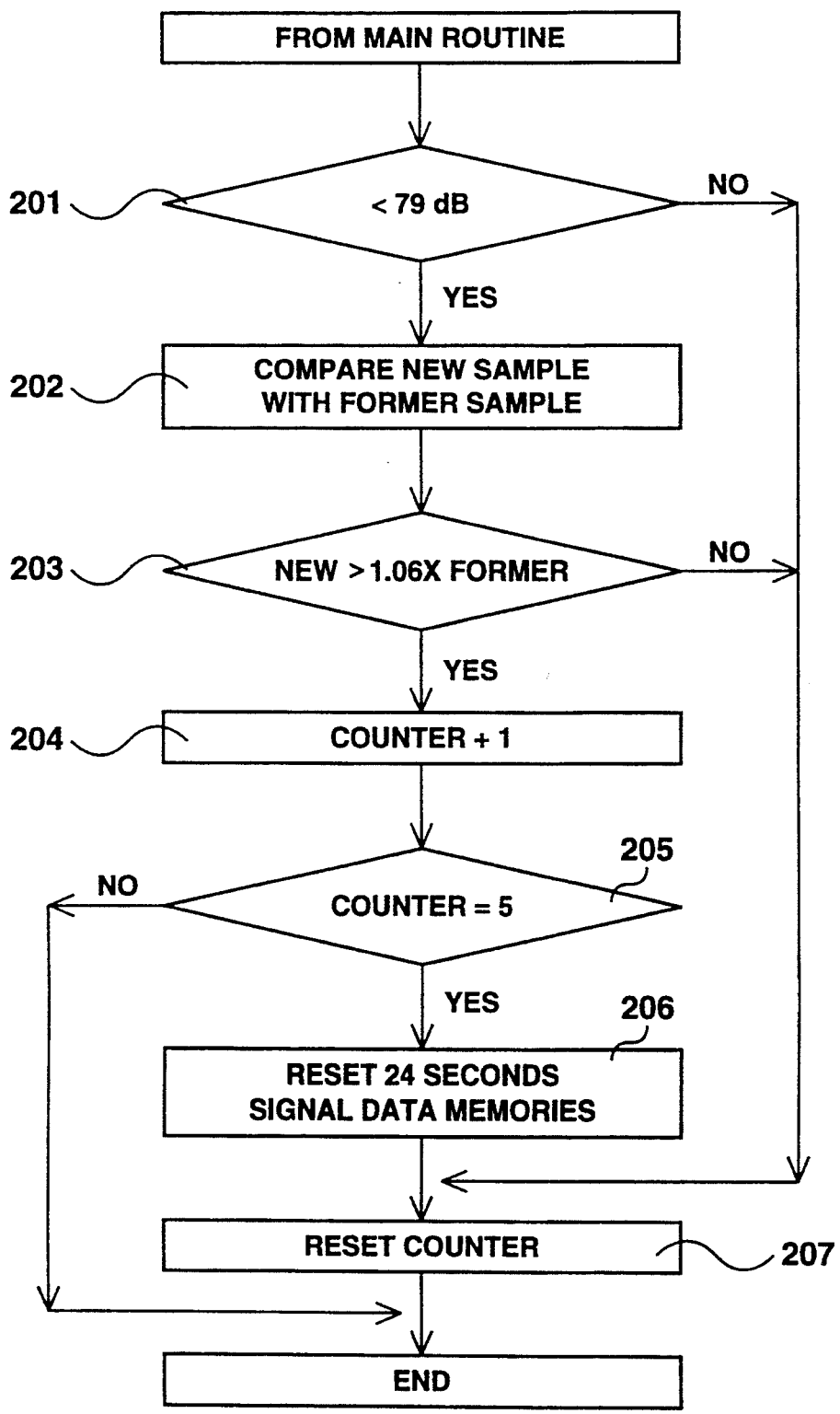
FIG. 5 is a flowchart illustrating a first subroutine used in the algorithm of FIGS. 4a–4c.
Figure 6:
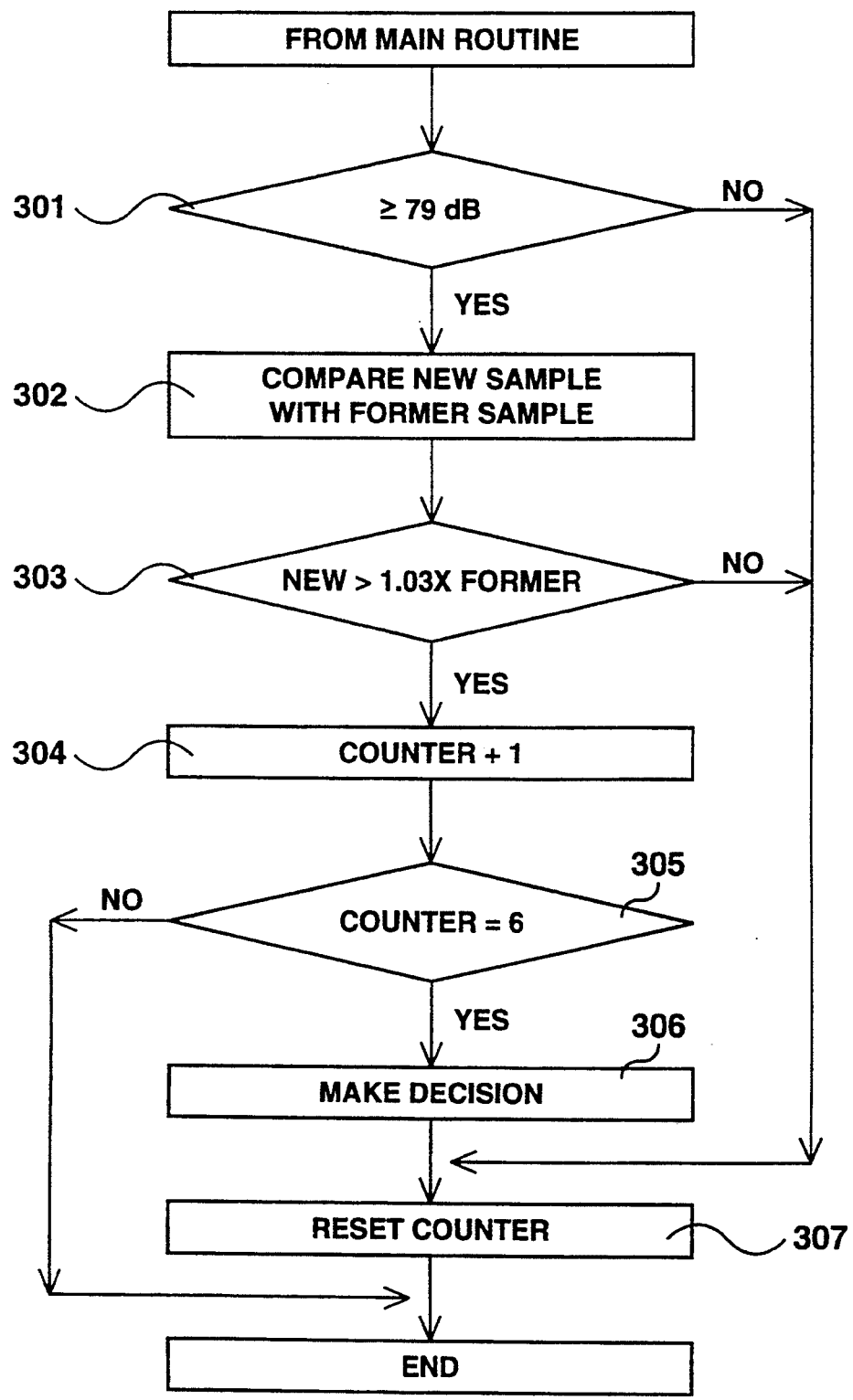
FIG. 6 is a flowchart illustrating a second subroutine used in the algorithm of FIGS. 4a–4c.

Step 115 then calls for a check of whether the sampled signal is increasing more slowly than expected for a tornado. This subroutine checks the increase in signal level every 1/6 second as shown in FIGS. 5. It is used when the sound level is less than 79 dB (step 200). In step 201, the last two samples are compared (step 202) and if the new sample is less then or equal to 6% greater than the previous sample (step 203), the signal is determined to not be slowly increasing and the subroutine proceeds to step 207. If the new sample is 6% larger than the former one, however, the counter is increased by one (step 204) and returns to the main routine for at least four passes (step 205). When the main routine has looped through the subroutine five times with the signal determined to be at least 6% greater each time, the microprocessor determines that the signal is increasing faster than tornado signals, and all 24 seconds signal dam memories are reset at step 206. However, if at any time the signal is not increasing, the counter is reset (207) and the determination is not made. Therefore, in order for a potential tornado to be identified the signal must increase gradually for five consecutive samples, each at least 6% larger than the previous one.

In the impulsive signal check at step 117 (FIG. 4b), each sample is checked using the subroutine of FIGS. 6A and 6B. This subroutine applies if the sound level is greater than or equal to 79 dB (step 301). After comparing samples (step 302), the new sample is 3% larger than the former one (step 303) for six counts (steps 304, 305, and 307), the processor determines that there is an impulsive signal (step 306) and sets the impulsive signal flag (steps 118 and 120).

Figure 7:
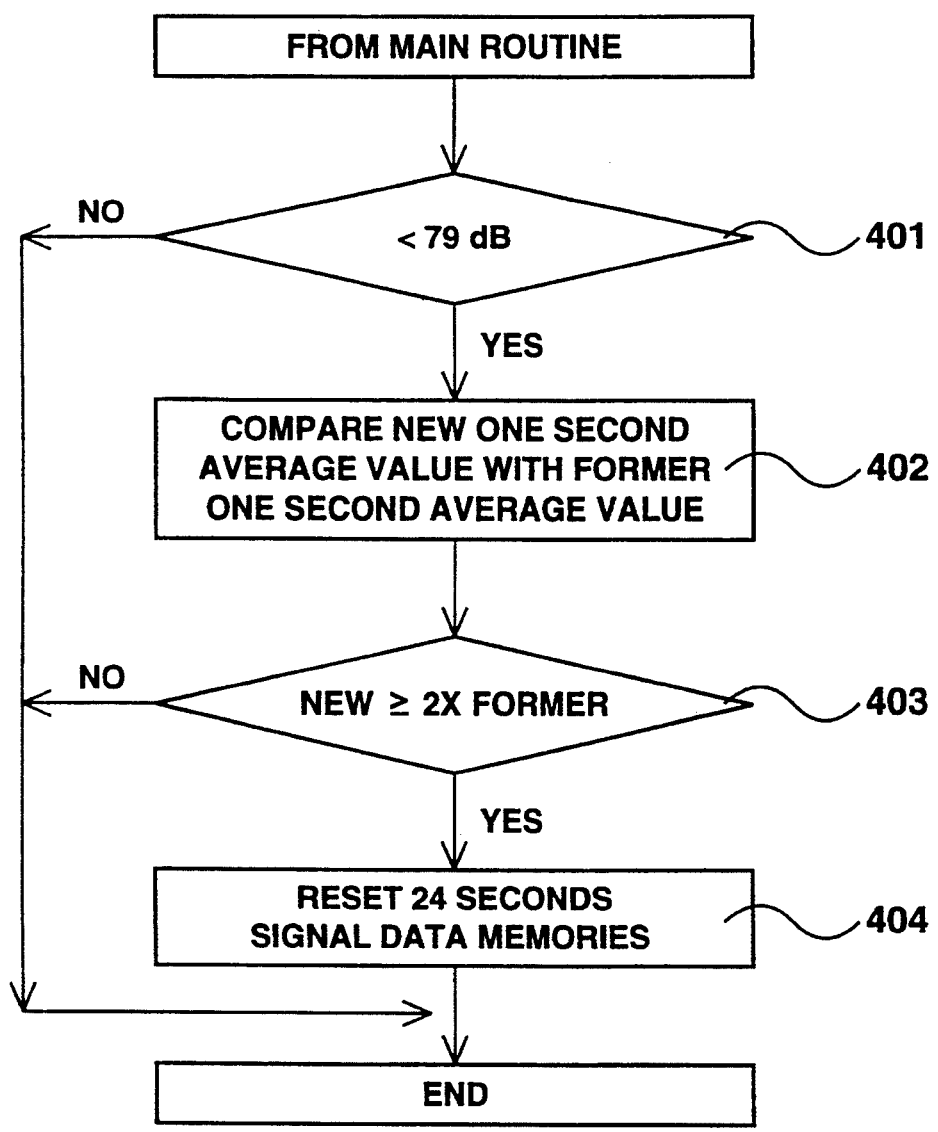
FIG. 7 is a flowchart illustrating a third subroutine used in the algorithm of FIGS. 4a–4c.

The memories are thus refreshed if there is a slowly increasing signal, and the impulse signal flag is set if there is an impulsive signal. According to step 121, before the 16th sample or one second, for a sampling rate of 1/16 second, the routine returns to step 104. Otherwise, the main routine proceeds to step 122, in which the average sound level over the last 16 samples is calculated and 79 dB, 85 dB, and 90 dB flags are set. Another check is made to confirm that the signal is slowly increasing as shown in FIG. 7. The subroutine of FIG. 7 applies to sound levels less than 79 decibels (step 401), and compares the one second sum with the previous one second sum (step 402). If the new one second sum is greater than or equal to twice the previous one (step 403), the signal is increasing faster than tornado signals and all 24 seconds of signal data memories are reset at stop 404.

Figure 8:
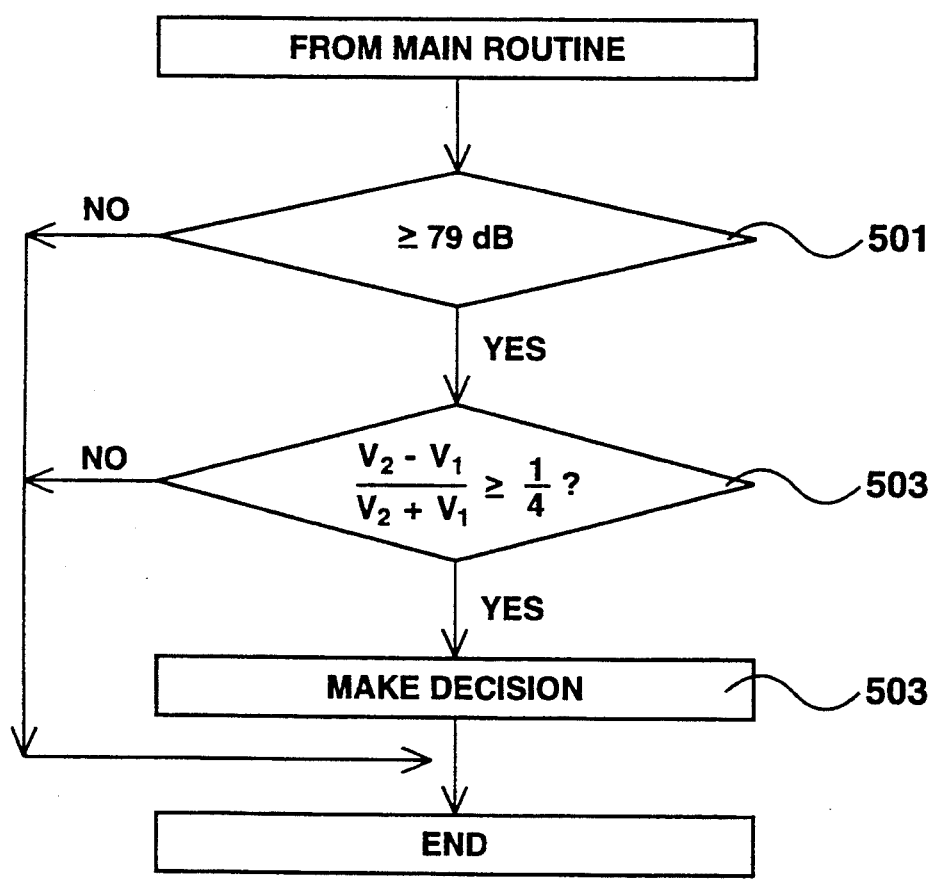
FIG. 8 is a flowchart illustrating a fourth subroutine used in the algorithm of FIGS. 4a–4c.

The next check is made at step 125 of the main routine, which calls the subroutine shown in FIG. 8, i.e., the one second impulsive signal check. This subroutine also applies to second levels greater than or equal to 79 dB (step 501), and confirms that the one second sum is impulsive (step 503) if the ratio of the difference of the summed values ($V_2-V_1$) to the summed values of ($V_2+V_1$) is greater than or equal to $\frac{1}{4}$ (step 502).

To this point, the processor has made the following checks: (1) If the sound level is less than 79 decibels, then the microprocessor checks whether a succeeding sample has increased by more than 6% over the previous sample, and if the new sample is 6% larger than the former sample, the counter is increased by one. If this increase occurs 5 successive times, then a decision flag indicating that the sound level is slowly increasing set as the subroutine returns to the main routine. If the sound level is greater than 79 decibels, then the subroutine checks whether the new sample is 3% larger than the former one before increasing the counter. (3) For sound levels less than 79 RB, the microprocessor then checks for a slowing increasing signal by checking whether the average signal has doubled over succeeding one second intervals. (4) Finally, the main routine calls for the impulsive signal subroutine for signals greater than or equal to 79 decibels. This subroutine compares the one second average value and checks whether the difference is $\frac{1}{4}$ of the sum.

Figure 9:
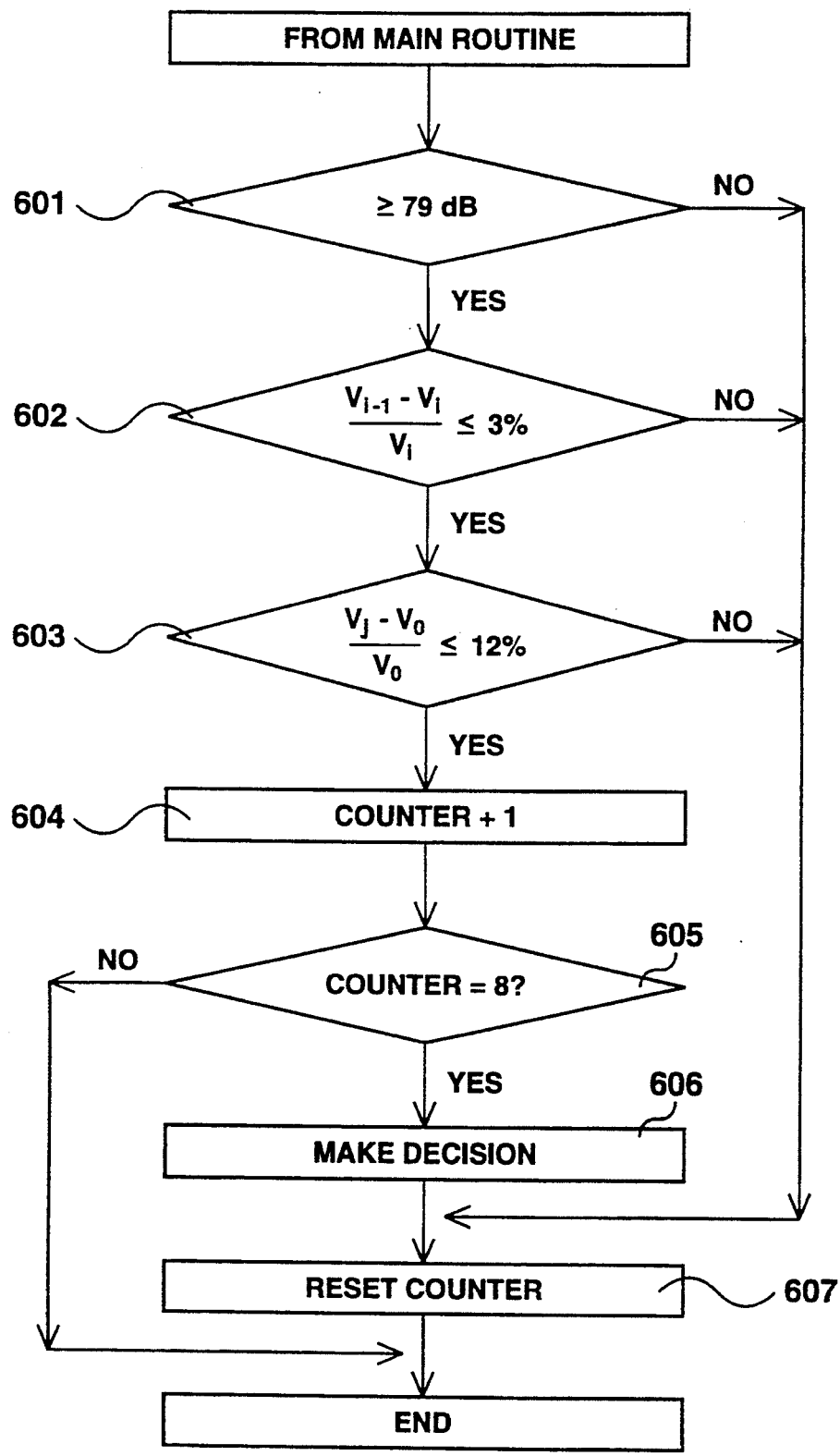
FIG. 9 is a flowchart illustrating a fifth subroutine used in the algorithm of FIGS. 4a–4c.

The final check is a constant value signal check for the one second sum for sound levels greater than or equal to 79 dB (step 601 of the subroutine shown in FIG. 9). In this subroutine, if the percentage increase $|V_{i+1}-V_i|/V_i$ (i=0 to 8) is less than 3% (step 602), and the percentage increase $|V_j-V_o|/V_o$ (j=5, 6, 7, 8) is less than 12% above the initial sound value $V_o$ (step 603) for eight counts (steps 604 and 605), a decision is made in step 605 that the signal has a constant value and the loop returns to step 101 to initialize the processor after resetting the counter (step 607).

Figure 4B:
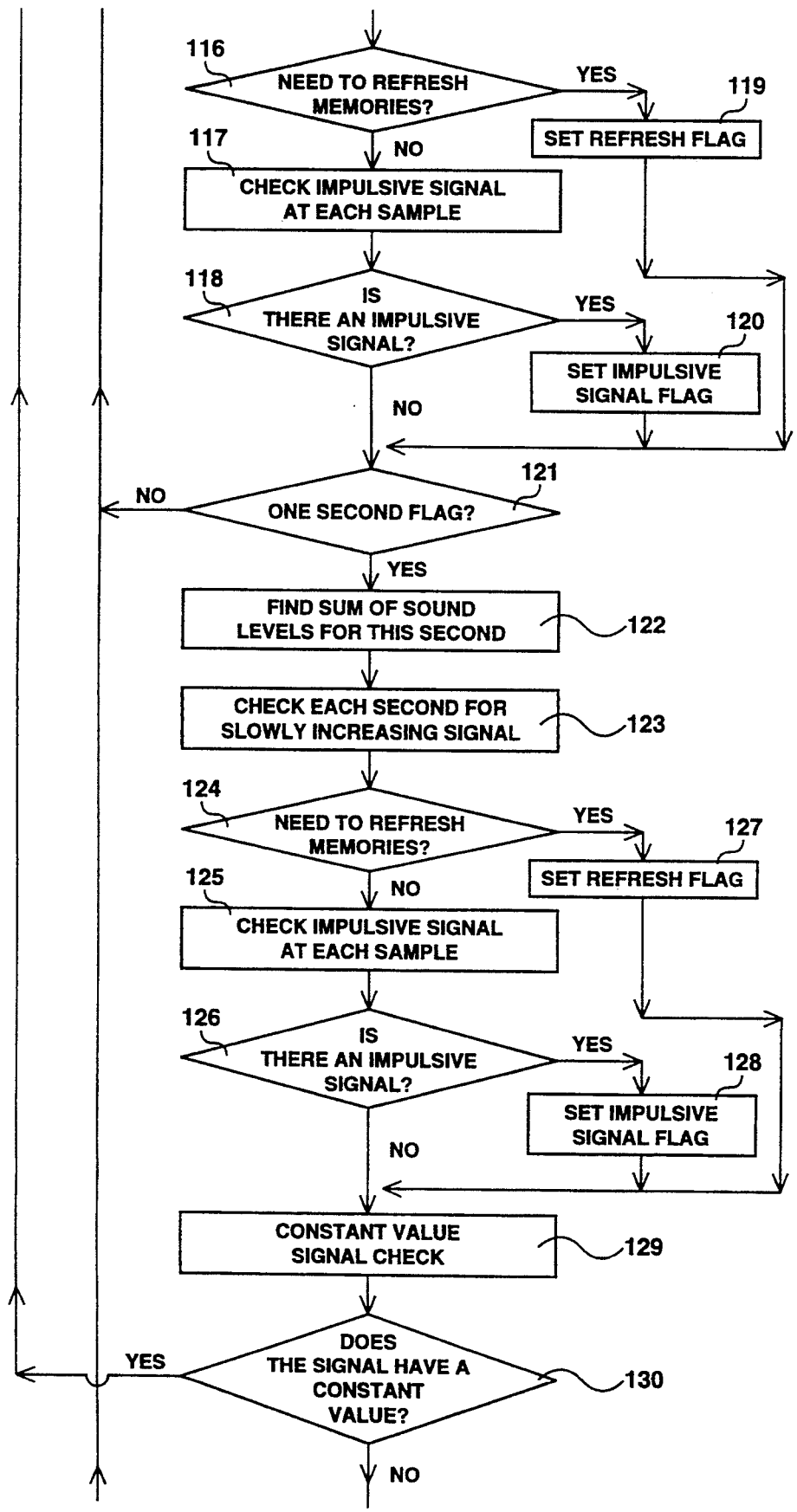
Figure 4C:
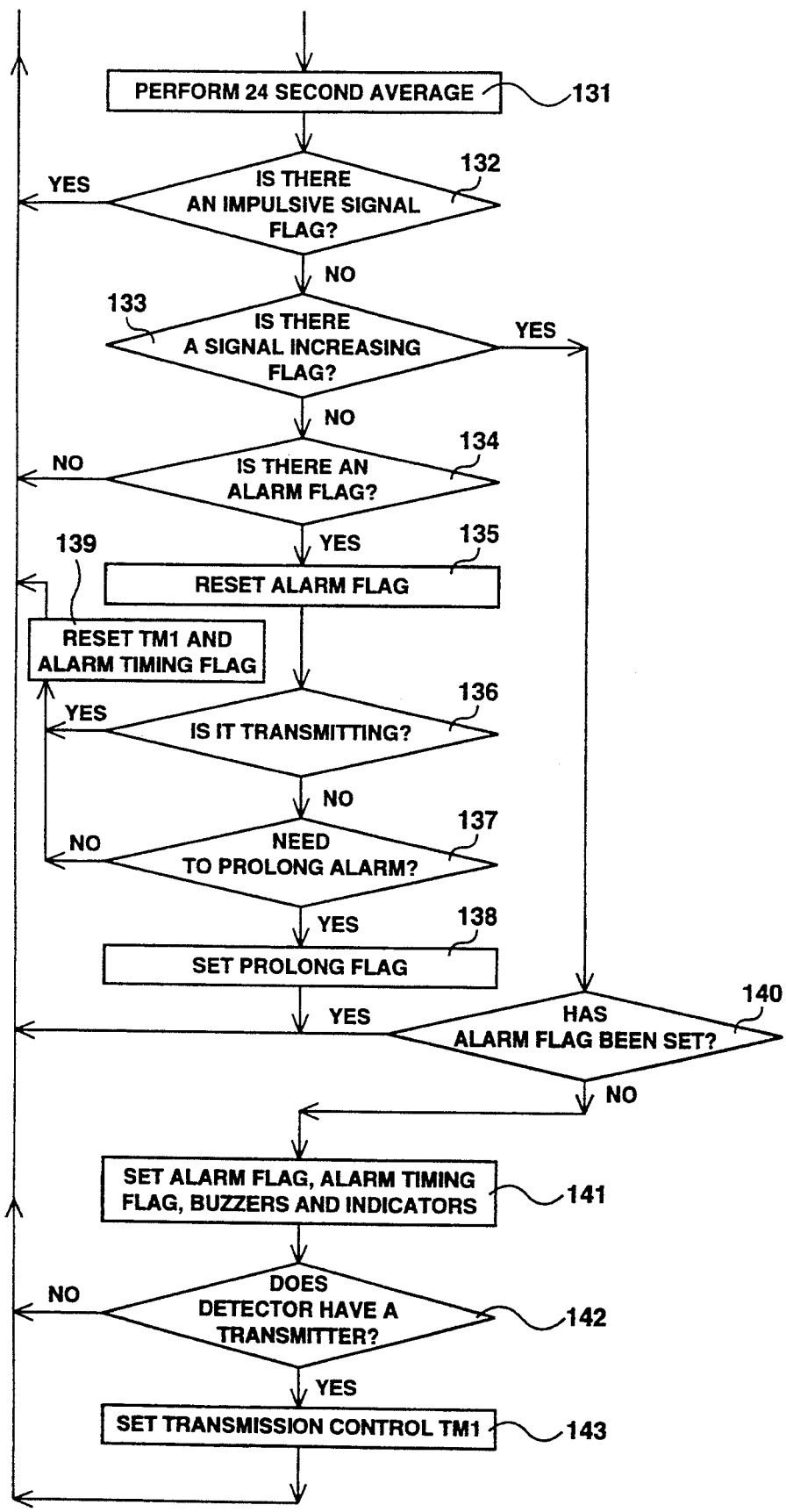

If the value is not constant, the processor is reinitialized at step 130 after resetting the counter at step 607, a 24 second sum is found and the new 24 second sum is compared to the previous 24 second sum at step 131 (FIG. 4c). If the 24 second sum is increasing (step 132), a counter is incremented by +1 and the routine goes to step 137 to check the conditions for alarm.

Figure 10A:
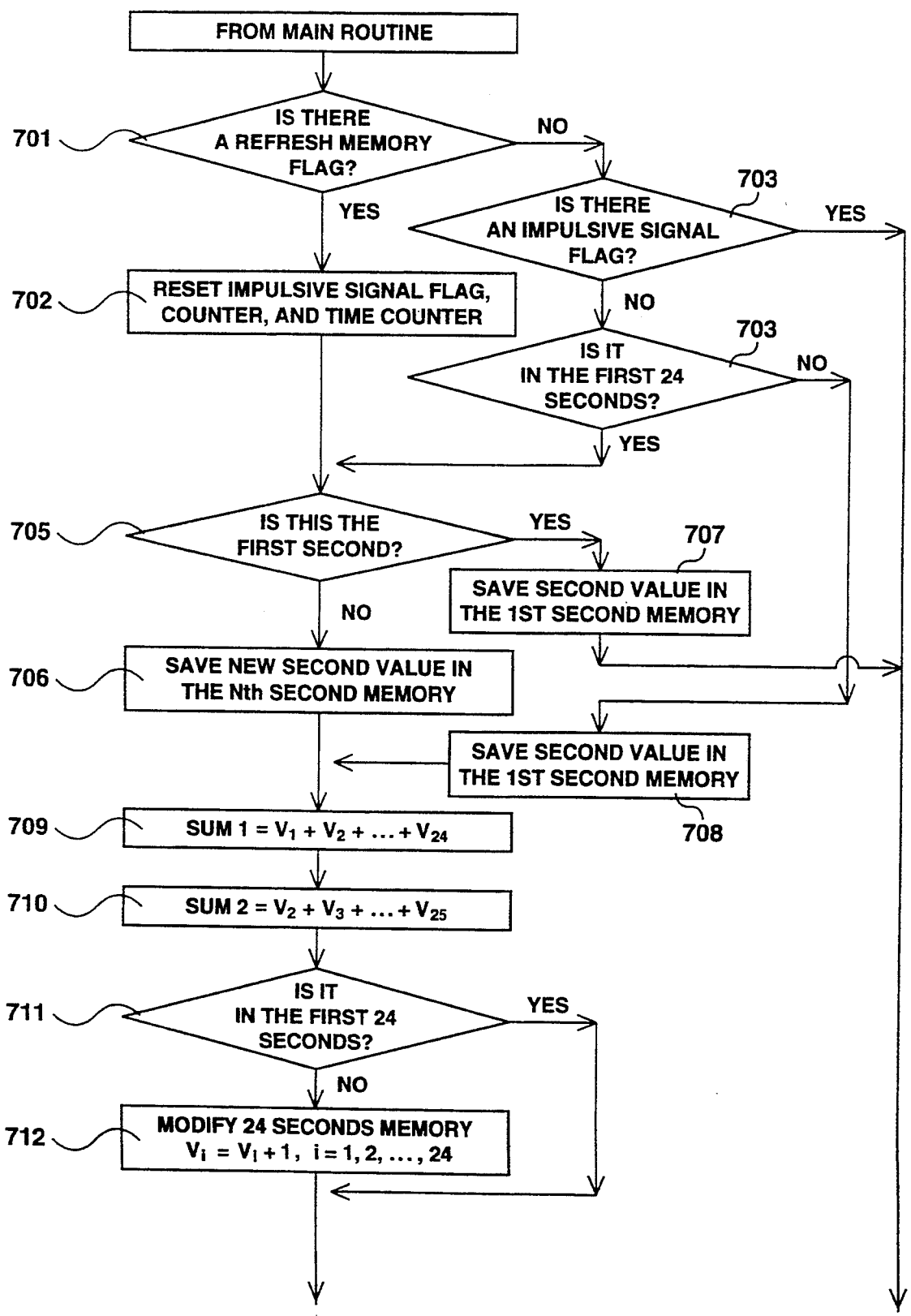
FIGS. 10a–10b form a flowchart illustrating a sixth subroutine used in the algorithm of FIGS. 4a–4c.
Figure 10B:
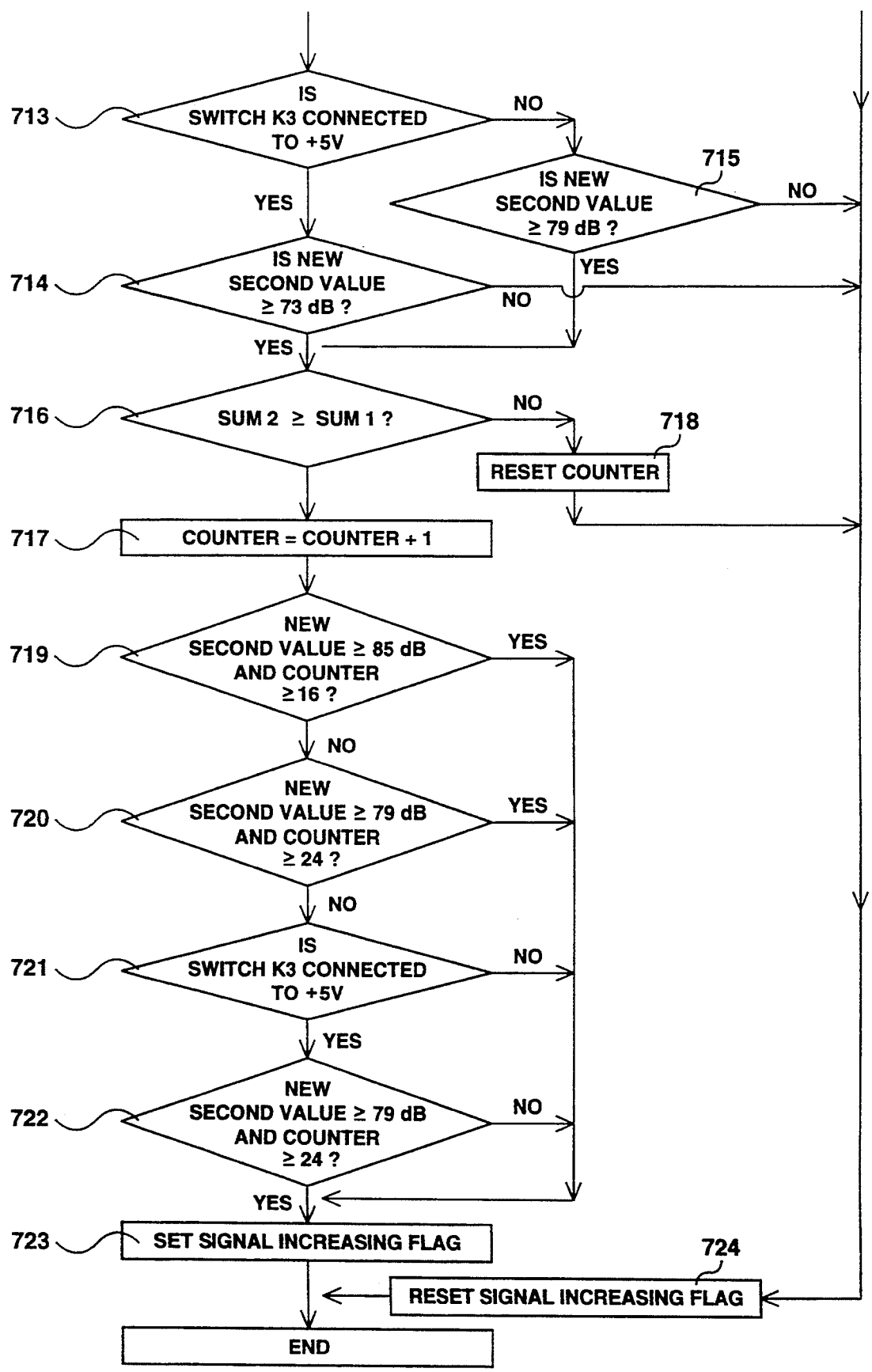

At step 131, the 24 second sum is checked to see if the signal is going up with time. If so, a tornado is present and the signal increasing flag is set. The detailed flow chart for this step is shown in FIG. 10a–10b from step 701 to step 724. At step 701 the routine checks to see if there is a refresh memory flag or not based on steps 116, 119, 124, and 127. If yes, at step 702, the impulsive signal flag, the counters, and the time counters related to impulsive signals are reset. If no, step 703 checks to see if there is an impulsive signal flag based on steps 118, 120, 126, and 128. If the impulsive signal flag is on, the new second value data is not saved and the procedure goes to step 724. At step 704, the routine determines if the test second is within the first 24 seconds. The data will be saved in the nth memories if the test second is in the first 24 seconds. Otherwise, the second value will be saved in the 25th second value memories at step 708.

Steps 705 and 707 check the first second and save the first second data value only (no more comparison) and goes to step 724. Step 706 saves the nth second value data in the first 24 seconds in the nth second value data memories. Steps 709 and 710 find the sum of the former 24 seconds SUM1 and the sum of the new 24 seconds SUM2.

Steps 711 and 712 rearrange the data memories of 24 seconds value data. Step 713 checks to determine if switch K3 is connected to +5V or ground. If switch K3 is connected to +5V, a more sensitive examination (as low as 73 dB) is checked at step 713. Otherwise, the 79 dB signal is checked at step 715.

At both steps 714 and 715, if levels are less than the threshold values they do not need to be treated, the sub-routine goes to step 724. For levels above the thresholds, SUM2 and SUM1 are compared at step 716. If the sum of the new 24 seconds value SUM2 is equal to or larger than the sum of former 24 seconds value SUM1, the time counter +1 at step 717; otherwise the counter is reset at step 718. Furthermore, the signal level of second value and the increasing time counter are checked at steps 719 through 722. If the signal level is more than 85 dB and the counter is more than 16, or the signal is more than 79 dB and the counter is more than 24, or the signal is more than 73 dB when the sensitive examination is needed and the counter is more than 32, an approaching tornado has been detected, and signal increasing flag is set at step 723. Otherwise, the signal increasing flag is reset at step 724 and control is returned to step 132 of the main routine. At step 132, the impulsive signal flag is checked. If the flag is set, the routine goes to step 104 to await the next sample. Otherwise, the alarm status is checked. At step 133, the signal increasing flag is checked. If that flag is set, an alarm is needed and the routine goes to 140. Otherwise, the alarm is not needed. If the system is not in alarm mode, as determined at step 134, the routine goes back to await the next sample. If the system is alarming, the alarm flag is reset (step 135).

At step 136, a check is made to determine if the module has a transmitter. If it does, terminal TM1, which controls a radio signal transmission is reset as is the alarm timing flag. If the module has a transmitter, it does not use the prolong alarm function. If the prolong alarm function is used, the need to prolong the alarm is checked (at 137), and the prolong flag is set (step 138) if necessary so that the alarm will stay on for 32 seconds. The prolong timing is controlled at step 113. If there is no prolong requirement, the alarm timing is reset at 139 before the routine goes back to await the next sample. If there is a prolong requirement, the prolong flag is set.

At step 140, the alarm flag is checked. If the flag is set, the routine awaits the next sample. Otherwise, the alarm flag, the buzzer, and the light indicators are set at step 141. The warning light and sound are treated at steps 110 and 112. Steps 142 and 143 check to see if there is a transmitter and, if so, set TM1 to begin transmission.

As a result of the subroutines described in connection with FIGS. 5–10, the microprocessor is able to determine if the signal level is within a certain amplitude range, for example, 79 decibels (or 73 decibels depending on the setting of switch K3), and if the level is increasing with time. If the source of sound is a tornado, the sound level will increase, though not necessarily continuously, as the tornado gets closer. As the level gets larger, the microprocessor sends interpretative DC signals to the buzzer (steps 138 and 139) until the tornado is very close, at a level above, for example, 90 decibels, at which time the microprocessor keeps the buzzer on continuously (steps 110 and 112), after which individuals in the affected area, having been alerted by the intermittent buzzing, will have approximately 30 seconds to one minute to seek shelter, if they haven't already.

Various modifications of the invention disclosed in the foregoing description will become apparent to those skilled in the art, and therefore all such modifications that rely on the teachings through which the invention has advanced the art are properly considered within the spirit and scope of the invention. Consequently, it is intended that the scope of the invention not be limited by the foregoing description, but rather that it be defined solely in accordance with the appended claims.

We claim:

1. An acoustic tornado detector, comprising:
   sound sensing means for sensing sound having frequencies, amplitudes, and rate of change of amplitude which correspond to those emitted by a tornado;
   processor means connected to the sensing means for determining whether the sound corresponds to that of a tornado.

2. A detector as claimed in claim 1, wherein said sound sensing means comprises a microphone, amplifier and filter means connected to the microphone for passing a signal which possesses characteristic acoustic frequencies of a tornado, detector means connected to the amplifier and filter means for converting the signal to a smoothly varying DC signal, and A-D means connected to the detector means for converting the smoothly varying signal to a digital signal, wherein said processor means comprises a microprocessor connected to the A-D means.

3. A detector as claimed in claim 2, wherein said amplifier and filter means comprises an amplifier and two bandpass filters, both of them tuned to 3 dB points at 180 Hz and 420 Hz.

4. A detector as claimed in claim 2, wherein said detector means comprises an RMS detector means connected between said amplifier and filter means and said A-D means.

5. A detector as claimed in claim 1, further comprising level determining means for determining whether a level of the sound is increasing, and sounding an alarm when an increase in the level has values characteristic of an approaching tornado.

6. A detector as claimed in claim 5, wherein said level determining means includes a microprocessor set to calculate whether signal levels representative of the sound level for each of a plurality of successive samples exceed a predetermined threshold level, to then calculate whether an average of said signal levels per unit time has increased for a predetermined threshold number of succeeding time units and, if both thresholds have been exceeded, to sound an alarm.

7. A detector as claimed in claim 6, wherein said predetermined threshold number of succeeding time units is 24 seconds when the signal level is 79 decibels, and 16 seconds for a signal level in excess of 85 dB.

8. A detector as claimed in claim 6, wherein said average of signal levels is represented by a sum of said signal levels and said predetermined threshold number of succeeding time units is 32 seconds when the signal level is between 73 dB and 79 dB, 24 seconds when the signal level is between 79 dB and 85 dB, and 16 seconds when the signal level is more than 85 dB.

9. A method of detecting tornadoes, comprising the steps of:
   (a) sensing sound having frequencies emitted by a tornado;
   (b) converting the sensed sound to electrical signals;
   (c) processing the electrical signals to convert them to a varying DC level which constitutes an electrical signal representative of a sound level of the sensed sound;
   (d) sampling the DC level and determining whether it is greater than a predetermined magnitude;
   (e) eliminating signals similar to said electrical signal which do not have an amplitude and rate of change corresponding to that of a tornado;
   (f) determining whether the level is increasing; and
   (g) sounding an alarm.

10. A method as claimed in claim 9, wherein said alarm is an audible alarm.

11. A method as claimed in claim 9, wherein said alarm comprises visible indicators.

12. A method as claimed in claim 9, wherein step (e) comprises the steps of:
   e1. comparing succeeding samples at a clock rate of 1/16 second, and if a succeeding sample is greater by at least 3% than a former sample for 6 consecutive comparisons, determining that there is an impulsive signal in which case five consecutive seconds of signal are not saved;
   e2. if the sound level is greater than 79 decibels, comparing a difference in successive one second average sound level values with a sum of successive one second average sound level values, and if a ratio of the difference to the sum is at least ¼, confirming that the signal is an impulsive signal;
   e3. if the sound level is less than 79 dB, comparing succeeding samples at a clock rate of 1/16 second, and if a succeeding sample is greater by at least 6% than a former sample for 5 consecutive comparisons, determining that there is a steadily increasing signal; and
   e4. if the sound level is less than 79 dB, comparing one second average value with previous one second average value, and if a succeeding one second average value is at least twice the previous one second average value, confirming that the signal is a steadily increasing signal.

13. A method as claimed in claim 12, wherein step (e) further comprises the step of:
   e5. if the sound level is greater than or equals to 79 decibels, checking whether a ratio of the difference in succeeding one second average values to an initial one second average value is less than 3% for succeeding values and, if the difference between an initial sound level value and a current sound level value to the initial sound level value is less than 12% for eight successive seconds, determining that there is a constant value signal, and
   e6. if the signal is determined to be constant, resetting the microprocessor.

14. A residence located in an area subject to tornados, comprising:
   a microphone positioned on an exterior of the residence;
   a control unit connected to the microphone and comprising means for sensing sound having frequencies which correspond to frequencies emitted by a tornado and means for determining whether the sound corresponds to that of a tornado; and
   an alarm,
   wherein said control unit further includes means for causing the alarm to sound when the sound has been determined to be that of a tornado.

15. A residence as claimed in claim 14, wherein said control unit further comprises means for determining whether the tornado is approaching, and sounding the alarm only when the tornado is approaching.

* * * * *